April 9, 1929.　　　A. B. TOMPKINS　　　1,708,161
VISOR STRUCTURE FOR AUTOMOBILES
Filed April 17, 1925　　4 Sheets-Sheet 1
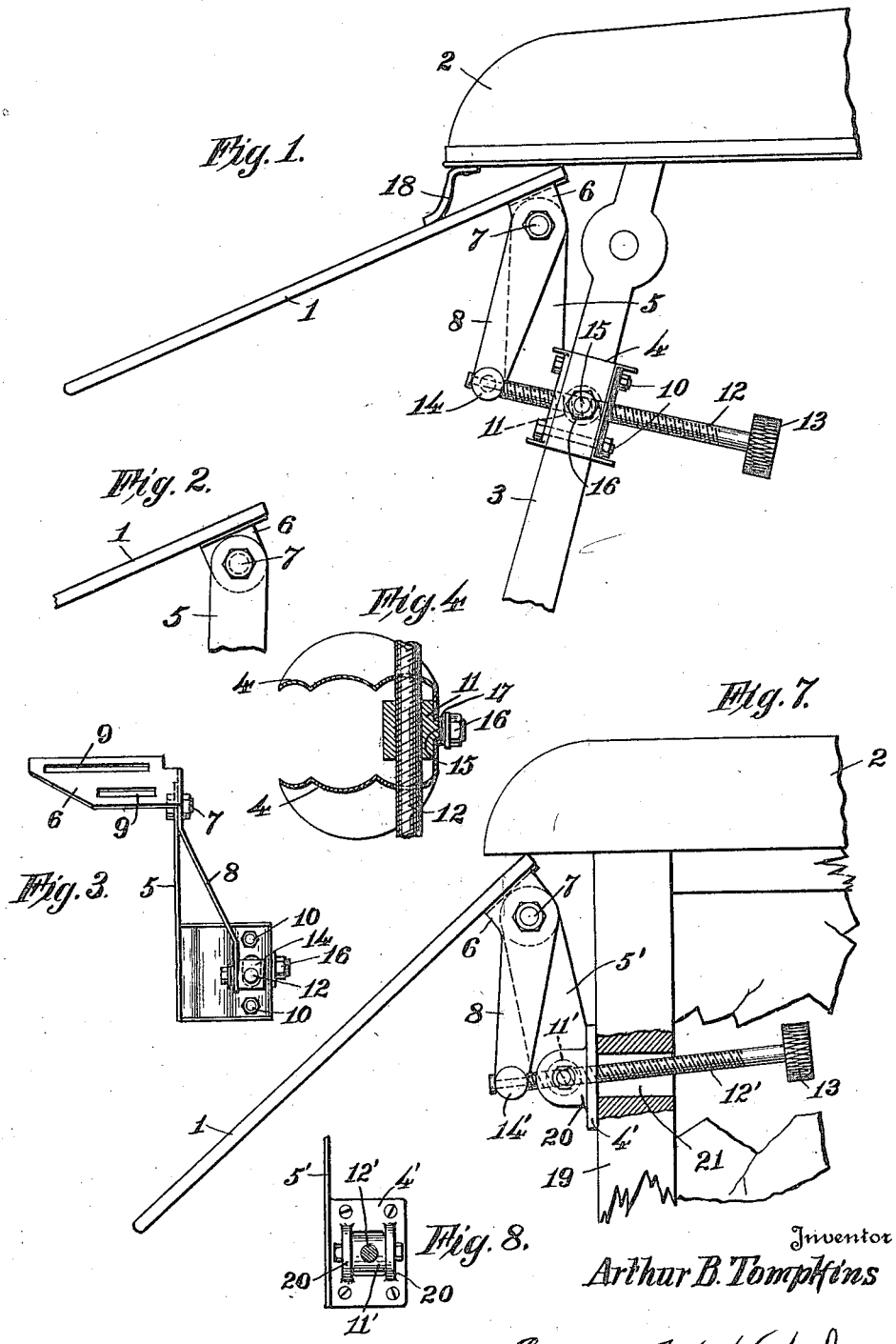
Inventor
Arthur B. Tompkins
By Edgar M. Kitchin,
his Attorney.

April 9, 1929.  A. B. TOMPKINS  1,708,161
VISOR STRUCTURE FOR AUTOMOBILES
Filed April 17, 1925  4 Sheets-Sheet 2
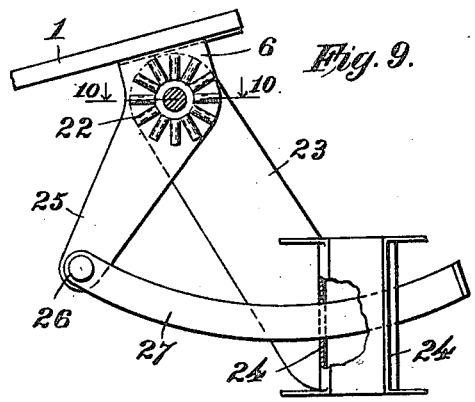
Fig. 9.
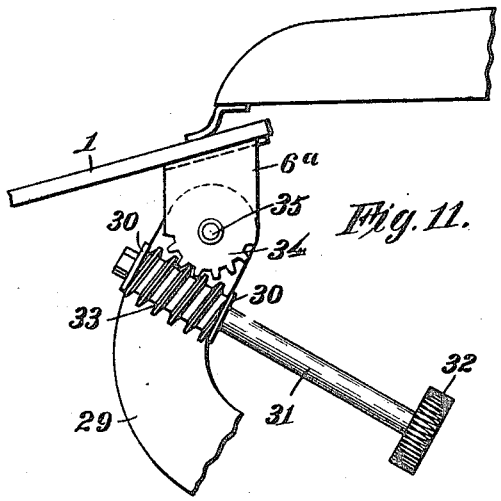
Fig. 11.
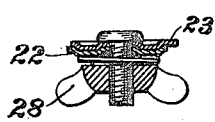
Fig. 10.
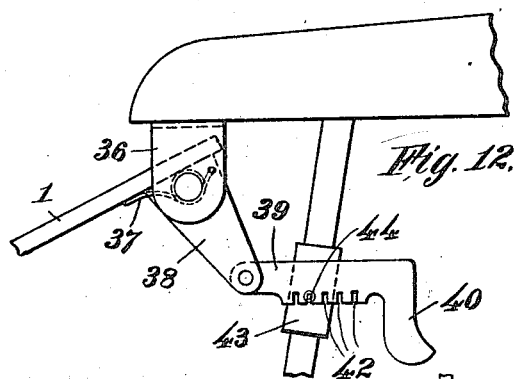
Fig. 12.
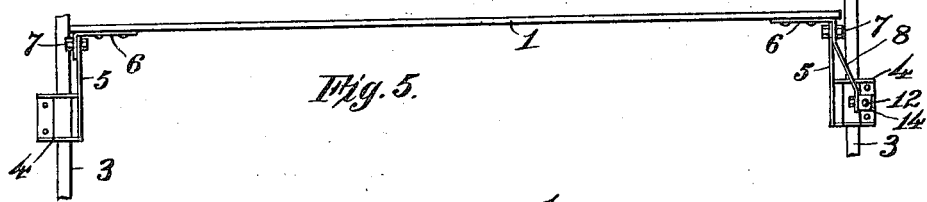
Fig. 5.
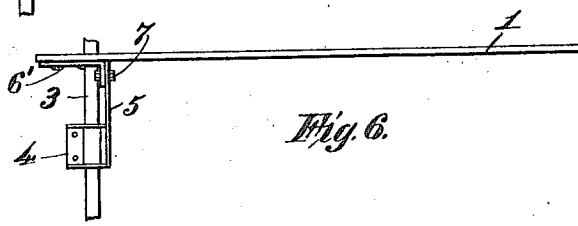
Fig. 6.
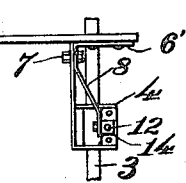
Inventor
Arthur B. Tompkins
By Edgar M Kitchin
his Attorney.

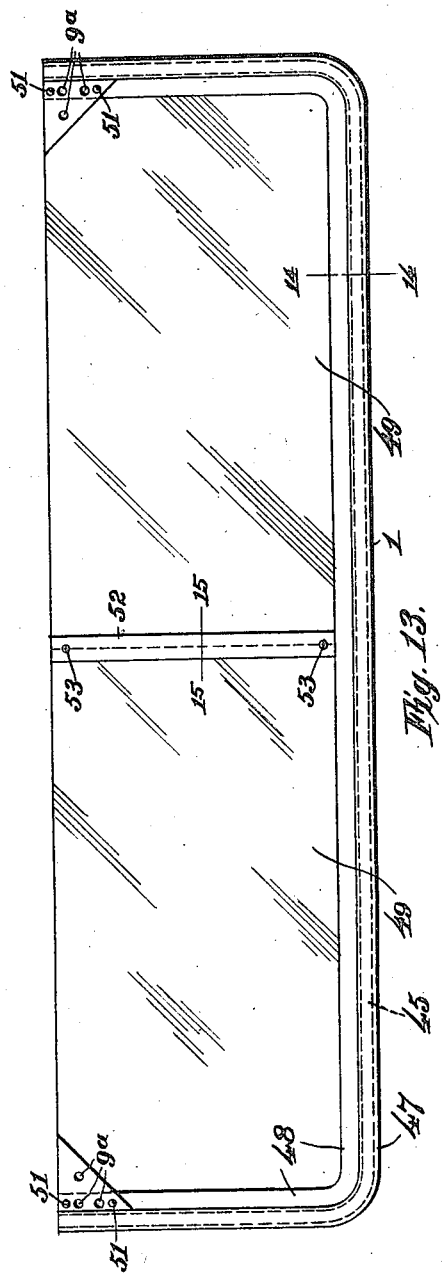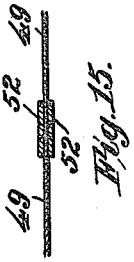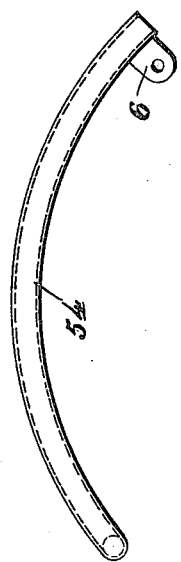

April 9, 1929.   A. B. TOMPKINS   1,708,161
VISOR STRUCTURE FOR AUTOMOBILES
Filed April 17, 1925   4 Sheets-Sheet 4
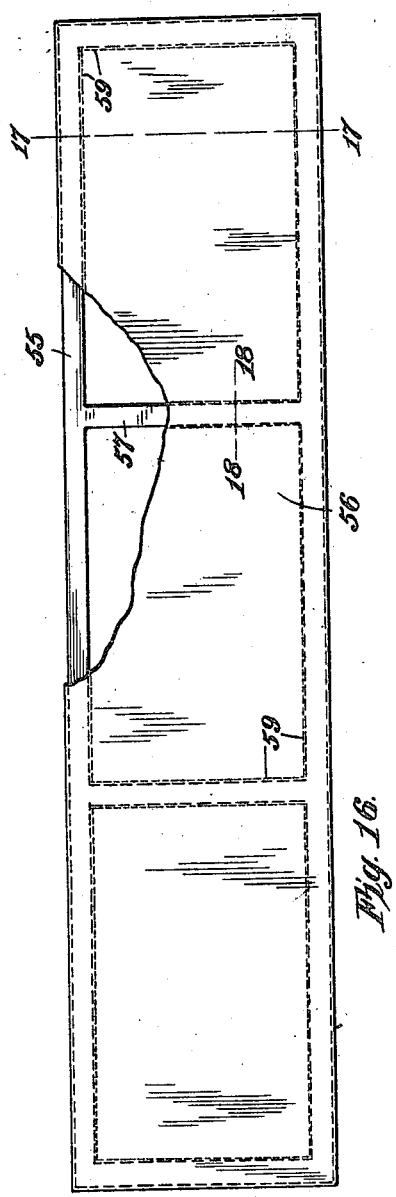
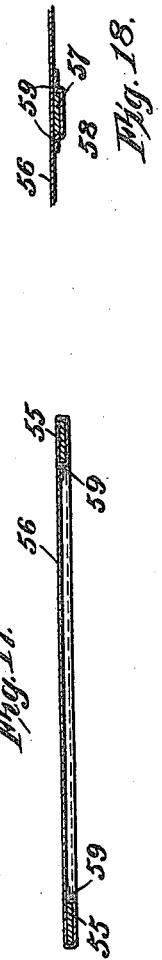
Arthur B. Tompkins
INVENTOR
BY Edgar M. Kitchin
his ATTORNEY Patented Apr. 9, 1929.

1,708,161

UNITED STATES PATENT OFFICE.

ARTHUR B. TOMPKINS, OF CRAWFORDSVILLE, INDIANA, ASSIGNOR TO THE LAPORTE ADJUSTABLE VISOR COMPANY, OF LA PORTE, INDIANA.

VISOR STRUCTURE FOR AUTOMOBILES.

Application filed April 17, 1925. Serial No. 23,790.

This invention relates to improvements in visors for automobiles, and more particularly to such as are adapted for adjustment to increase their efficacy under all conditions.

One of the objects in view is the formation of the visor in a manner to accommodate the variable expansion of its cover sheeets while maintaining sufficient stability to enable effective support at one end at various adjusted positions.

A more detail object is the facilitating of adjustment of the visor to various positions and various angles according to light and climatic conditions.

With these and further objects in view as will in part hereinafter become apparent and in part be stated, the invention comprises certain novel constructions, combinations and arrangements of parts as subsequently specified and claimed.

In the accompanying drawings,—

Figure 1 is a fragmentary view in side elevation of the top forward portion of an automobile equipped with an embodiment of the present invention taken from the side of the actuating apparatus.

Figure 2 is a detail, fragmentary view of the visor and its supporting bracket at the opposite side from that seen in Figure 1.

Figure 3 is a front elevation of the actuating mechanism and visor supporting bracket, parts being seen in perspective.

Figure 4 is a transverse sectional view taken on the plane indicated by line 4—4 of Figure 3 on an enlarged scale.

Figure 5 is a view in front elevation of the parts seen in Figure 1, the parts being shown on a reduced scale.

Figure 6 is a similar view of a slight variation of the same, visor supporting brackets reversely bent being employed for supporting the visor relative to a windshield of different length from that seen in Figure 5.

Figure 7 is a view similar to Figure 1 of the invention as applied to a sedan, parts being broken away and seen in section for disclosing interior structure.

Figure 8 is a detail, front elevation of the oscillating nut and its bearing bracket.

Figure 9 is a view in end elevation of a visor and its bracket and actuating apparatus in slightly modified form, parts being broken away and seen in section to disclose parts in the rear.

Figure 10 is a horizontal section taken on the plane indicated by line 10—10 of Figure 9.

Figure 11 is a view similar to Figure 1 of a further embodiment, parts being broken away and other parts omitted.

Figure 12 is a similar view of a still further embodiment.

Figure 13 is a plan view of the visor detached, parts being broken away.

Figure 14 is a transverse section taken on the plane indicated by line 14—14 of Figure 13.

Figure 15 is a detail, longitudinal section taken on the plane indicated by line 15—15 of Figure 13.

Figure 16 is a view similar to Figure 14 of a modified embodiment of the visor.

Figure 17 is a transverse section therethrough taken on the plane indicated by line 17—17 of Figure 16.

Figure 18 is a fragmentary, longitudinal section therethrough taken on the plane indicated by line 18—18 of Figure 16.

Figure 19 is an end view of a further modified embodiment of the visor detached.

Referring to the drawings by numerals, 1 indicates the improved visor itself, the details of which will be hereinafter set forth, the said visor including a rigid frame of sufficient stability to enable retention of the visor in any adjusted position incident to the action of a single adjusting means engaging the frame at one point. 2 indicates the top of an automobile, and 3, 3 the posts for the windshield. Clamped to each post 3 is a casing 4, each provided with an upstanding bracket frame 5. An angle bracket 6 is fixed to the frame of the visor 1 at each end and has an arm lapping the upper end portion of the respective bracket arm 5 and pivotally connected thereto, as indicated at 7, the pivot 7 being preferably an ordinary bolt. The arm of the bracket 6 at one end of the visor 1 is comparatively short, as indicated in Figure 2, while the corresponding arm of the bracket 6 at the other end is provided with an extension 8 projecting downwardly below the pivot, as seen in Figure 1, for receiving actuating apparatus hereinafter described. Each of the brackets 6 has its horizontal arm slotted, at 9, 9, for adjustably receiving anchoring bolts 9ᵃ, 9ᵃ (as seen in Figure 13) passing through the slots and through appropriate apertures in the frame of the visor 1. The said slots 9 thus enable application of the brackets to a visor of a given length notwithstanding variation in the length of the wind-shield of various cars appearing between the posts 3. When such variation in length of the wind-shield exceeds the adjustment provided for in the slots 9, I employ other brackets similar to brackets 6 and indicated at 6′, 6′ in Figure 6, the brackets 6′ being identical with brackets 6 except that brackets 6′ have their horizontal arms extending in an opposite direction relative to their pendent arms from the location of the horizontal arms of brackets 6. Thus, if the brackets 6 are said to have their horizontal arms extend inwardly, then the horizontal arms of brackets 6′ will extend outwardly and afford ample adjustment for accommodating the visor 1 of a single definite length to various cars having wind-shields of different lengths, and of a variation in length greater than accommodated by the adjustment afforded by the slots 9.

The casings 4 are preferably each formed of sheet metal in two sections, as seen in detail in Figure 4, the sections being clamped together by bolts 10, 10 about the respective post 3, and that casing 4 carrying the arm 5 to which the brackets 6 having the extension 8 is pivoted is provided with a swiveled nut 11 through which is threaded an adjusting screw 12 having a knurled head or manually operated handle 13 arranged inward of the car. The outer end of the bolt 12 is swiveled in a block 14, which block in turn is swiveled to the extension 8 of the pendent arm of the respective bracket 6. The nut 11 may be swiveled to the casing 4 in any of various ways, one of which is shown in detail in Figure 4, and consists of a lateral trunnion 15 formed integral with the nut 11 and extending through an aperture in the side flange of one of the plates of the casing 4. A bearing washer is preferably applied on the exposed portion of the trunnion 15, and a nut 16 is threaded onto the trunnion outside of said washer so as to retain the parts in the given position while allowing the nut 11 to be free to oscillate. For increasing the length of the bearing in sheet metal, the material of the wall of the flange through which the aperture is formed for receiving the trunnion 15 is preferably stamped out to form an annular boss providing a bearing 17. The block 14 is preferably similarly swiveled to the extension 8. Thus the visor 1 may be adjusted to any angle desired by merely manipulating the handle 13, and the frame of the visor 1 is so formed, as hereinafter stated, as to insure rigidity of the visor in any adjusted position notwithstanding the fact that the extension 8 and actuating bolt 12 exist only at one end of the visor. A weather strip 18 of flexible material, such as waterproof fabric, is preferably fixed along the overhanging portion of the roof 2 of the car so as to have its lower edge portion rest on the visor 1, and give or follow the visor in its various movements.

In Figures 7 and 8, I have illustrated a very slight modification of the structure just above described, the modification consisting solely in adapting the structure for application to a sedan. The visor 1 and its supporting brackets are, therefore, identical with that above described and the same reference numerals and description will apply. The supporting brackets 5′, however, are carried by plates 4′, which are connected by screws, or other appropriate attaching means, to the wooden uprights 19 of a sedan. One of the plates 4′ is formed with outstanding ears 20 in which are journaled the trunnions of an oscillating nut 11′ through which is threaded the operating bolt 12′, the outer end portion of which bolt is swiveled in a swivel block 14′ carried by the lower end of the extension 8. The upright 19 is formed with an aperture 21 for accommodating the passage and lateral play of the bolt 12′.

In Figures 9 and 10 is shown a further embodiment in which the visor 1 is pivotally supported by brackets 6 in the manner heretofore described, but one of said brackets has its depending arm formed with radial serrations 22 about the pivotal connection with the supporting bracket 23, the upper end portion of said supporting bracket being formed with intermeshing serrations, and the lower end is carried by a casing 24 clamped to the wind-shield post, as hereinbefore described with respect to the structure seen in Figure 4. The arm having the serrations 22 is provided with the operating extension 25, which is pivotally engaged at 26 by an arcuate link 27 extending through a slot in the casing 24 so that the inner end of the link may be grasped and moved in or out by the operator for varying the angularity of the visor 1. To insure retention of the visor in any given position, the bolt forming the pivot at the place of the serrations 22 is engaged by a wing-nut 28, which is designed to be tightened to the required extent for insuring sufficient intermeshing of the serrations to retain the visor 1 wherever positioned. It is not the intention to adjust the nut 28 with every adjustment of the visor 1, but only to give the required tension by the adjustment of the nut, and then to manipulate the visor as required from within the car without changing the position of the nut 28 until wear or vibration requires tightening thereof.

In Figure 11 is shown a still further embodiment in which a bracket arm 29 is supported by the windshield post in the manner above described, but not shown in this figure, the said bracket being formed with ears 30, 30 near its upper end in which is journaled a shaft 31 extending to a point within the car and provided with an operating head or handle 32. Mounted on or fixed to the shaft 31 between the ears 30 is a worm 33 meshing with a worm gear 34 formed integral with the depending arm of the supporting bracket 6ª sustaining the visor 1. The bracket 6ª is otherwise identical in structure and function with the brackets 6, and is pivoted, at 35, to the upper end portion of the arm 29. Angular adjustment of the visor 1 in this construction is accomplished by a rotation of the head 32.

In Figure 12 is shown a still further embodiment in which brackets 36 are fixed to and depend from the top or roof of the car, and the visor 1 is mounted between and pivotally connected to the brackets 36. A spring 37 is anchored, at one end, to each of the brackets 36, is coiled about the respective pivot, and has its free end resting against the under face of the visor 1 so as to serve as a counter-balance for taking up the excess weight of the visor extending outward beyond the pivot, whereby angular adjustment of the visor may be accomplished with but slight exertion. A bracket similar to bracket 6 is fixed to the frame 1 near one end thereof, and has a depending extension 38 pivoted to a link 39, which link extends inward to a point within the car and is provided with an operating handle 40. The under face of the link 39 is provided with a series of notches 42. A casing 43 is fixed to the wind-shield post of the car and provided with a laterally-extending pin 44 adapted to engage in one of the notches 42 for retaining the link 39 in a given adjusted position, whereby the visor 1 of this construction may be adjusted angularly and locked in any given adjusted position by merely lifting the link 39 out of engagement with the pin 44 and moving the link to a position with the required notch 42 above the pin, and then dropping the link down into engagement with the pin.

It will be observed that when the visor 1 is adjusted by the operation of the bolt 12, it will be locked at any of its angular positions as soon as manipulation of the bolt 12 is discontinued. This is due to the fact of the engagement of the thread of the bolt with the nut 11, such structure forming what is well known as an irreversible adjusting mechanism. This same result follows the action of bolt 12′ and corresponds with the functioning of the serrations employed in the structure seen in Figure 9 which lock the visor in its various angular positions. The worm thread 33 also functions to lock the visor at any point of adjustment, and it is also similarly locked by the engagement of the pin 44 in any of the notches 42.

The visor 1 itself is preferably formed of a marginal frame of stable material supporting an intermediate web of appropriate lighter material. As seen in detail in Figures 13 and 14, the frame preferably consists of a steel or like rod 45 preferably shaped to form a wide, open U or yoke, and the rod is enclosed in a sheet 47, preferably of relatively thin material, such as aluminum, with the edge portions of the metal outstanding inwardly from the rod to form leaves 48, 48, between which is secured the web 49 of the visor, which may be of pyralin, or other translucent or otherwise appropriate thin sheet material. At the terminals of the rod 45 are arranged the corner plates 50, which are riveted at 51, 51, to the leaves 48, and are apertured for the passage of the bolts 9ª for engaging the slots 9 of brackets 6. When the material of the web 49 is of less length than the full length of the visor, the sheets thereof have their adjoining edges bound by transverse strips 52, 52, preferably of aluminum, or other appropriate material, riveted at 53, 53. The visor thus constructed is of unusual stability and the frame made up of the rod 45 and its covering is sufficiently strong to receive all of the shifting stresses at one end and to transmit them throughout the visor effectively without subjecting the web 49 to appreciable strain.

In Figure 19 there is illustrated a modified form of the visor, the visor being identical with that just above described, except for the fact that instead of being flat, as seen at 1 in Figures 1 and 13, the visor 54 of Figure 19 is arched transversely for more readily deflecting moisture and thus enabling the visor to be more readily positioned for preventing a driving storm from destroying the vision of the driver by depositing moisture on the wind-shield.

In Figures 16, 17 and 18 is illustrated a further embodiment of the visor in which the frame is made preferably rectangular of flat strips of material 55, preferably steel. The frame is covered preferably by a web 56 of leather, or like material, the leather being passed over and lapped under the sides and ends of the frame 55 and stitched together at 59, 59. Cross strips 57 connect the side bars of frame 55 at spaced points in the length of the visor and are preferably covered from beneath by extra pieces of fabric 58 (such as leather) appropriately stitched to the main web 56.

It will be understood that the triangular corner plates 50 apertured to receive the bolts 9ª and the supporting and actuating apparatus engaged by said bolts will be utilized on the visor seen in Figure 16 the same as above described with respect to visor 1.

What is claimed is:

1. In a visor structure for automobiles, the combination with the visor frame, of supports adapted to be secured to the automobile, brackets for said frame pivotally mounted on said supports, one of said brackets having a portion extending beyond the adjacent pivot therefor, a member swiveled in the outer end of said extended portion, a member swiveled in the adjacent support, each said member being formed with an opening through it at right angles to the axis on which it swivels and one of said openings being threaded, and an operating rod extending through and rotatably supported in said openings and having a threaded portion to engage the threads of said threaded opening in one of said members and means to hold it against endwise movement with respect to the other member, whereby rotation of said rod will swing said extended portion relative to the adjacent support to adjust said visor.

2. In a visor structure for automobiles, the combination with a visor frame, of supports adapted to be secured to the automobile and provided with up-standing arms, brackets for said frame pivotally mounted on said arms, one of said brackets having a portion extending beyond the adjacent pivot therefor, a member swiveled in the outer end of said extended portion and formed with an opening through it at right angles to the axis on which it swivels, a member swiveled in the adjacent support and formed with a threaded opening through it at right angles to the axis on which it swivels, and a rod threaded through the opening in the last mentioned member and rotatably supported in the opening of the other member and provided with means to engage said other member to prevent endwise movement with respect thereto.

In testimony whereof I affix my signature.

ARTHUR B. TOMPKINS.